(12) United States Patent
Arzich et al.

(10) Patent No.: US 12,730,434 B2
(45) Date of Patent: Sep. 8, 2026

(54) SYSTEM AND METHOD FOR ADJUSTING FAIL-SAFE MONITORING IN AN INDUSTRIAL AUTOMATION PLANT

(71) Applicant: Siemens Aktiengesellschaft, Munich (DE)

(72) Inventors: Martin Arzich, Nuremberg (DE); Rene Graf, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 789 days.

(21) Appl. No.: 18/014,808

(22) PCT Filed: Jun. 21, 2021

(86) PCT No.: PCT/EP2021/066793
§ 371 (c)(1),
(2) Date: Jan. 6, 2023

(87) PCT Pub. No.: WO2022/008214
PCT Pub. Date: Jan. 13, 2022

(65) Prior Publication Data

US 2023/0273603 A1 Aug. 31, 2023

(30) Foreign Application Priority Data

Jul. 8, 2020 (EP) .................................... 20184809

(51) Int. Cl.
*G05B 19/418* (2006.01)
*B25J 9/16* (2006.01)
(Continued)

(52) U.S. Cl.
CPC ........ *G05B 19/4185* (2013.01); *B25J 9/1676* (2013.01); *G05B 19/41875* (2013.01);
(Continued)

(58) Field of Classification Search
CPC .......... G05B 19/4185; G05B 19/41875; G05B 19/41895; G05D 1/249; G05D 1/617;
(Continued)

(56) References Cited

U.S. PATENT DOCUMENTS

2011/0298579 A1* 12/2011 Hardegger ................ F16P 3/14 340/3.1
2012/0262727 A1* 10/2012 Bonin .................... B25J 9/1676 356/614

(Continued)

FOREIGN PATENT DOCUMENTS

| | | |
|---|---|---|
| DE | 102017123295 | 4/2019 |
| EP | 3467601 | 4/2019 |
| WO | 2018064840 | 4/2018 |

OTHER PUBLICATIONS

PCT International Search Report dated Aug. 30, 2021 based on PCT/EP2021/066793 filed Jun. 21, 2021.

*Primary Examiner* — Rami R Okasha
(74) *Attorney, Agent, or Firm* — Cozen O'Connor

(57) ABSTRACT

A safety system of a mobile component of an industrial automation plant and method for adjusting failsafe monitoring in the industrial automation plant, wherein a sensor of a mobile component of the industrial automation plant is used to determine a position and orientation of the mobile component relative to a further component of the industrial automation plant in a failsafe manner, a communicative and failsafe coupling is set up between the mobile component and the further component, and successful coupling results in a monitoring region of the mobile component are adjusted, where a monitoring region of the further component is also possibly adjusted.

17 Claims, 8 Drawing Sheets

(51) Int. Cl.
*G05D 1/242* (2024.01)
*G05D 1/617* (2024.01)
*G05D 107/70* (2024.01)

(52) U.S. Cl.
CPC ........... *G05D 1/2424* (2024.01); *G05D 1/617* (2024.01); *G05D 2107/70* (2024.01); *Y02P 90/02* (2015.11)

(58) Field of Classification Search
CPC ............. G05D 2105/45; G05D 1/2424; G05D 2107/70; G05D 2109/10; G05D 2111/17; Y02P 90/02; Y02P 90/60; B25J 9/1676
See application file for complete search history.

(56) References Cited

U.S. PATENT DOCUMENTS

| | | | | |
|---|---|---|---|---|
| 2014/0277723 | A1* | 9/2014 | Nishimura | G05B 19/4061 700/255 |
| 2019/0094873 | A1 | 3/2019 | Wei et al. | |
| 2019/0105788 | A1 | 4/2019 | Pilz et al. | |
| 2020/0101971 | A1 | 4/2020 | Fan et al. | |
| 2021/0156951 | A1* | 5/2021 | Brunner | G01S 17/894 |
| 2021/0205994 | A1* | 7/2021 | Dai | B25J 9/1674 |
| 2023/0048039 | A1* | 2/2023 | Kokushi | B25J 5/007 |

* cited by examiner

SLS872
SLS871
820
STO873

901
920
900
921

SYSTEM AND METHOD FOR ADJUSTING FAIL-SAFE MONITORING IN AN INDUSTRIAL AUTOMATION PLANT

CROSS-REFERENCE TO RELATED APPLICATIONS

This is a U.S. national stage of application No. PCT/EP2021/066793 filed 21 Jun. 2021. Priority is claimed on European Application No. 20184809.0 filed 8 Jul. 2020, the content of which is incorporated herein by reference in its entirety.

BACKGROUND OF THE INVENTION

1. Field of the Invention

The invention relates a safety system of a mobile component of an industrial automation plant and to a method for adjusting failsafe monitoring in the industrial automation plant.

2. Description of the Related Art

In modern production plants, the conventional conveyor belt is being replaced more and more often by mobile transportation means, referred to as DTSs (Driverless Transport System) or AGVs (Automated Guided Vehicle). These vehicles usually move along predefined pathways directed by colored markings on the floor or inductive or capacitive track guidance systems recessed in the floor. Modern vehicles are also able to navigate with the assistance of sensors, and so the pathways are generally present only virtually and the vehicles orient themselves in the surroundings via various sensors. These freely navigating vehicles, which, in contrast to track-guided vehicles, can also dynamically travel around obstacles, are called AMRs (Autonomous Mobile Robot).

A preferred sensor system for AGVs or AMRs is laser scanners, which use time-of-flight measurement, less commonly also phase shifting, of a laser beam to survey the surroundings. The laser beam is rotated via a rotating mirror, with the result that a large sensing range is produced, typically 180 or even 270 degrees. The laser scanners are used primarily as a safety device, because they are of failsafe design internally. For this purpose, the scanner is also provided with defined fields that it monitors for intrusion and communicates the same to a superordinate, likewise failsafe controller via a failsafe output signal or failsafe communication.

FIG. 1 shows the typical use of laser scanners for AGVs, on the left for a rectangular AGV 101, which also requires the sides to be monitored, on the right for a rather rotationally symmetrical AGV 102, which, owing to its differential kinematics, for example, can only travel forwards or backwards and can only rotate on the spot, which means that full protection on all sides is not necessary. The regions 110, 120 that can be monitored by a respective laser scanner 130, for example, maximum regions that can be monitored, are each shown in dots.

Hatching in the lower illustrations in FIG. 1 is also used to show possible monitoring regions or safety fields 111, 121 that result in the respective AGV slowing or even stopping.

In addition to being used on mobile vehicles, the laser scanners are also used on stationary machines to detect in a failsafe manner that, for example, a human being has approached, and in order to shut down all or part of the machine accordingly in order to avoid danger. The laser scanners can therefore replace mechanical barriers having failsafe door contacts in a similar manner to light curtains or light grids.

FIG. 2 shows a use that is known from the prior art for laser scanners and a light curtain for machines. Three sides are protected by mechanical solutions 201 and the fourth side is protected by a laser scanner 233 or a light curtain 211 so that this allows material or products to be put into or removed from the machine. When a light curtain is used, it is additionally necessary to ensure that the machine shuts down quickly enough when the light curtain is intruded upon. A combination of the two described optical safety devices is therefore used in part to detect the approach of a human being using the laser scanner, to slow the machine, such as a robot, to a safe speed, and to initiate the final shutdown, which also occurs quickly enough owing to the slowing that has previously occurred, using the light barrier.

If the laser scanner is intruded upon by a person walking past the machine, the machine is only slowed, without production having to be stopped.

In the modern production plant mentioned at the outset, the two uses often combine, i.e., the machines detect the approach of a human being via laser scanners and the AGVs supply material or the goods being produced to the machines. Whether these are track-guided or freely navigating is irrelevant for further consideration.

To date, an AGV, just like a human being, has triggered the safety device of another, in particular stationary, machine, in particular a laser scanner and/or light curtain, and the machine thus slows the motion sequence or shuts down completely. If, for example, a workpiece is meant to be machined without being transferred from the AGV to the machine, then a blockage occurs because the machine is unable to operate due to the intrusion on the safety device when the AGV is in front of or in it.

At present, therefore, machines, inter alia, are used that have no contactless safety devices such as laser scanners or light grids, but rather mechanical ones such as fences or gates that need to be opened for the AGV to enter and exit, but need to be closed during machining by the machine. Other additional sensor systems or measures need to be used in this case to ensure that a human being has not accessed or can access the machine at the same time as the AGV. This is complex and in particular difficult to achieve, because the human being needs to be recognized as an interfering object in a certified failsafe manner.

Furthermore, machining steps have hitherto been implemented such that a workpiece is transferred from the AGV to the machine, and so that the AGV can leave the detection region of the laser scanners of the machines again. However, this firstly requires the relevant mechanical system in the machine and secondly slows the production time, because the machine must be at a standstill during the transfer. Similarly, depending on the mechanical design, it is also necessary here to ensure that a human being does not access the machine together with the AGV but, in contrast to the latter, does not leave again.

US 2020/010101971 A1 already discloses an AGV that has a mechanism to avoid collisions in a defined space, such as a warehouse. There is provision for communication with a controller (for example, for controlling a crane) and with other AGVs for the purpose of position determination.

SUMMARY OF THE INVENTION

In view of the foregoing, it is an object of the present invention to provide improved safety monitoring for automation tasks distributed between components of an industrial automation plant.

This and other objects and advantages are achieved in accordance with the invention by a method for adjusting failsafe monitoring in an industrial automation plant, wherein a sensor of a mobile component of the industrial automation plant is used to determine a pose of the mobile component relative to a further component of the industrial automation plant in a failsafe manner, where a communicative and failsafe coupling is set up between the mobile component and the further component, and where successful coupling results in a monitoring region of the mobile component are adjusted.

The term failsafety is understood in the present application to mean compliance with the guidelines introduced for functionally safe systems, in particular integrated manufacturing systems. Such requirements relating to functional safety are defined, for example, in industrial settings by the regulations in the standard series EN 61508 Functional safety of electrical, electronic, programmable electronic safety-related systems. Various mechanisms, such as redundant data processing, for complying with the requirements concerning functional safety are known in this context. DIN EN ISO 11161 "Safety of machinery—Integrated manufacturing systems—Basic requirements" deals with safety aspects that are important for the safety-relevant connection of machines. The terms failsafe and safety-oriented are used synonymously.

A mobile component within a plant, in particular an AGV or AMR, can solve an automation problem, for example, machining a workpiece, together with a further component, in particular a further mobile component or a stationary component, via the described method such that requirements relating to failsafety are met and therefore, for example, the protection of human beings who are in the plant, in particular a factory or workshop, is ensured in compliance with the standard.

The communicative and failsafe coupling, such as via Industrial WLAN or alternatively via other wireless or wired communication connections, connects the mobile component and the further component to one another, particularly as an integrated manufacturing system. As a prerequisite for such coupling, the pose of the mobile component relative to a further component is determined in a failsafe manner. This involves, for example, information about the pose of the mobile component relative to the further component or relative to a reference component or a reference marker being determined correctly.

The term pose is understood in the present disclosure to mean the information relating to position and orientation. The failsafe determination of the pose of the mobile component ensures that the mobile component knows with sufficient certainty how its position and orientation relative to the further component should be rated. By way of example, the pose is determined directly in relation to the further component or indirectly using reference values. By way of example, the mobile component ascertains its own position absolutely or relative to the further component or a reference component. Depending on the degrees of freedom of the mobile component, position determination is sufficient to determine the pose in three-dimensional space. By way of example, the mobile component ascertains its own orientation absolutely or relative to the further component or a reference component. The mobile component particularly preferably determines the pose based on predefinable and/or predefined information that provides details about the relationship between the mobile component and the further component. The pose of the mobile component is preferably determined with a predefinable degree of accuracy.

It is therefore possible to ensure that a monitoring region of the mobile component can be adjusted, such as extended or reduced or modified, without there being the risk of gaps in the monitoring arising in which, for example, a human being could be injured by one of the components involved. In particular, safety regions to be monitored based on the further component are advantageously monitored at least in part via the mobile component, for example, in addition to the safety regions to be monitored by the mobile component on the basis thereof.

Therefore, in particular a safe and defined modification, in particular extension, of the monitoring regions of the mobile component, which could also be referred to as protection spaces, is accomplished. This permits, for example, the operation of a gripper arm on the mobile robot, because the position is definite. Furthermore, for example, the further component is permitted to interact with the AGV, because the latter undertakes protection against hazard zones of the further component.

The successful communicative and failsafe coupling results in safety information being able to be shared between the mobile component and the further component. Sharing safety information includes, for example, the mobile component using its own safety sensor system to undertake monitoring of regions that the further component cannot monitor on account of the mobile component, such as because they are concealed by the AGV. Sharing safety information can likewise include sensors of the mobile component undertaking the task of sensors of the further component. This can also comprise case switchover for the safety sensor system.

Sharing safety information can also consist in safety functions that relate to the further component, for example, which initiate a stop procedure in a multiaxis robot of the further component, being triggered by the mobile component. As such, for example, the sensor of the mobile component can detect an intrusion on the adjusted safety region and bring about a safety function when the further component is driven.

For example, an emergency stop switch on an AGV also affects a robot of the further component that is loading the AGV.

Within the setting of functionally safe systems in industry, the degree of danger and hence the requirements relating to hardware and software are indicated in the performance level (PL). The applicable safety levels to be observed are also called the safety level or safety integrity level (SIL) in the international standardization according to IEC 61508/IEC61511. In order to ensure compliance with performance level d (PLd), which is required for robot arms, for example, for safety functions, the monitoring region of the mobile component is adjusted only on successful coupling with the further component, and a prerequisite for this is in turn the safety-oriented detection of the position and orientation of the mobile component.

As such, it is possible to ensure that the transmission of the safety-oriented signals by the mobile component and the processing thereof on the further component also occurs at least at PLd. Failsafe signals can thus be used across systems in the coupled state.

This allows a plant operator non-compliant use of a mobile component, such as an AGV, in conjunction with a further component, such as a stationary robot, during production. The options for flexible use of machines in production cycles are therefore considerably increased, which means that the productivity of the whole plant is increased.

In accordance with one embodiment, a monitoring region of the further component is furthermore adjusted. By way of example, successful coupling then furthermore has the effect that the monitoring region of the further component can be adjusted in accordance with the state coupled with the mobile component. This means that it is possible to take account of hazard sources, modified from the point of view of the further component, that newly arise as a result of the interaction with the mobile component. By way of example, regions that are no longer accessible by a safety sensor system of the further component on account of the mobile component are no longer monitored by said safety sensor system, but rather by the safety sensor system of the mobile component. Other previous monitoring regions of the further component no longer need to be monitored on account of the extent of the mobile component, for example, because the mobile component does not spatially cover these regions itself.

In accordance with one embodiment, an intrusion on the adjusted monitoring region of the mobile component causes initiation of a safety function, in particular of the mobile component and/or of the further component. The adjusted monitoring region can consist of multiple fields monitored by the safety sensor system of the mobile component, for example. There can be provision for different safety functions for an intrusion on different fields. There is provision for different safety functions for different fields, for example, which functions affect drives of the mobile component differently or affect different drives of the mobile component, and/or different fields for different safety functions, which in turn affect firstly drives of the mobile component and secondly drives of the further component.

In accordance with one embodiment, an intrusion on the adjusted monitoring region of the further component causes initiation of a safety function, in particular of the mobile component and/or of the further component. The successful coupling advantageously also renders safety information, such as information about an intrusion on the monitoring region of the further component, which region has in particular likewise been adjusted, available on the mobile component, or initiates or implements a safety function derivable from this information on the mobile component, in particular on the drives thereof.

This advantageously accomplishes the sharing of safety information and the cross-system use of failsafe signals between the mobile and further components in both directions.

In accordance with one embodiment, the monitoring region of the mobile component is adjusted based on a safety region of the further component that is activated up to the coupling or based on a safety region of the further component that is demanded on account of the coupling.

The further component can be equipped with its own safety sensor system, for example, which is itself established to monitor predefinable fields. Up until the coupling, these fields are monitored as a monitoring region. For example, in the case of a stationary further component, for example, a machining station with a robot or manipulator, they include fields around the machining station. These previously monitored fields are taken into consideration for adjusting the monitoring by the mobile component.

In the case of a likewise mobile further component, the monitoring region before the coupling can consist of fields stretching in the direction of travel, for example, for which different functions are initiated depending on the distance from the mobile component, in particular warning signal outputs or speed reduction.

For a mobile further component that is stationary, there can likewise be provision for different fields having associated safety functions, such as stopping a robot installed on the further component or disconnecting the robot from the power supply. These previously monitored fields are also taken into consideration for adjusting the monitoring by the mobile, in particular respective different mobile, component after two mobile components are coupled. In particular, the two monitoring regions are adjusted by virtue of the new danger situation being taken into consideration. The adjusted monitoring region is configured based on the application or situation. By way of example, circular monitoring regions of the uncoupled components at a standstill are adjusted by virtue of their defining an outer shell of a region to be monitored for an adjusted monitoring region. By way of example, the adjusted monitoring regions take into consideration both dangers that newly arise on account of the coupling and monitoring that is not or no longer needed on account of the coupling.

In addition, safety regions that have become necessary only as a result of the coupling, which exist for the coupled system as a whole on account of the manner of operation of the further component and the coupling thereto, can be monitored by the safety sensor system of the mobile component. By way of example, parts of the monitoring region that are monitored by the mobile component after the coupling as a result of the demanded safety regions were previously not monitored by the further component, particularly because it does not have its own safety sensor system. As such, in the coupled state, regions are monitored that did not need to be monitored previously, for example, because a robot of the further component can be moved only in the coupled state.

In accordance with one embodiment, the monitoring region of the mobile component is adjusted by virtue of regions previously monitored by a monitoring region of the further component being monitored by the monitoring region of the mobile component on account of the coupling. By way of example, parts, in particular individual fields, of the monitoring regions can be adopted by the mobile component after the coupling. By way of example, the monitoring case changes such that the safety sensor system of the mobile component adopts monitoring fields of the further component in part or completely. Similarly, regions can continue to be monitored by the further component unchanged despite the coupling. By way of example, it is not necessary for the entire monitoring region of the further component to be adopted, but rather only a region around the mobile component in the coupled state.

In accordance with one embodiment, the monitoring region of the mobile component is adjusted by virtue of a monitoring mode, in particular a safety function, being adjusted, in particular supplemented or switched over, at least for a portion of the monitoring region, in particular for regions that overlap fields monitored by a monitoring region of the further component up to the coupling. By way of example, in addition to adjusting the monitoring regions in respect of the fields, i.e., the spatial extent of the monitoring region, it is also possible to adjust the logic used to initiate a safety function. By way of example, following successful coupling for a monitoring region, in particular a monitored field, of the mobile component, an intrusion results in two safety functions being triggered, firstly a safe limited speed state (SLS) for a drive of the further component, in particular a drive of a gripper robot installed thereon, and secondly a so-called safe torque off (STO) for a gripper robot installed on the mobile component. In such a case, the robot of the further, for example, stationary, component slows and the robot of the mobile component is disconnected from the power supply.

In accordance with one embodiment, the monitoring region of the further component is adjusted by virtue of a region being removed from the monitoring by the further component based on the position of the mobile component. By way of example, this allows the mobile component itself not to be recognized as a hazard object and particularly allows the component or a robot mounted on the mobile component to stop or move in front of or in the further component without the monitoring by the further component initiating a safety function, for example, continuing to report or constantly reporting an intrusion and in particular then stopping or initiating other safety measures.

In accordance with one embodiment, the monitoring region of the further component is adjusted by virtue of a safety device between the mobile component and the further component being deactivated. Particularly in the case of further components that are in the form of stationary machining stations, there is often provision for safety devices such as laser grids or laser curtains or other optical devices in order to prevent human beings from reaching in or gaining access. Such a safety device is deactivated in the event of successful coupling, and at the same time the coupled integral system is monitored such that gaps in the monitoring that arise as a result of the deactivated safety devices are compensated for by the adjustment of the monitoring region of the mobile component and preferably also that of the further component. In the case of mobile components that are in the form of mobile machining stations, for example, with mechanical safety devices such as windows, and in particular are securely connected to the further component after the coupling, only a subregion of the light barriers in which the safety devices of the stationary component overlap the mobile component is deactivated, for example. As such, a robot of the mobile component can interact with the further component and in particular can enter the region of the further component, which is otherwise protected by the light barrier, without triggering the light barrier and in particular an emergency stop for the robot arm of the further component. This is permissible according to the standard, because such a described mobile component itself blocks the relevant regions by way of mechanical elements, such as its base, profiles and windows.

In accordance with one embodiment, the pose is determined via a contour detection method. Reliable determination of the position and orientation of the mobile component in relation to the further component can advantageously be accomplished via a contour detection method in which the surroundings are recorded at a certain height above the floor, for example. By way of example, a laser scanner, installed in a failsafe manner, of the mobile component is used for failsafe implementation of the contour detection. The mobile component can predefine a specific contour, for example, the detection of which can prompt it to perform classification of its own position and orientation in relation to the further component. In general, a multiplicity of contours can be set up on a laser scanner of a mobile component.

In accordance with one embodiment, a contour of the further component is detected for the contour detection method.

By way of example, the contour to be detected is mounted on a surface, this being referred to as positive application to the available surface. Similarly, the contour can be made in a surface, as a result of which it is better protected against mechanical influences. This is then referred to as negative application to the surface. The risk of the contour to be detected colliding with a human being or machine in the plant then subsides, as a result of which it is not unintentionally damaged or deformed, which would make detection impossible.

When multiple contours are set up in the mobile component, coupling is possible using a multiplicity of further components provided with the respective contours. The use of a safety-oriented contour allows failsafe coupling and therefore ultimately compliance with the present standards.

In accordance with one embodiment, a standard safety level, in particular a certified safety level, is applied when determining the pose of the mobile component, when setting up the communicative and failsafe coupling and when adjusting the monitoring region. In particular, the safety level is determined by the danger from robots installed on the components and by the amount of opportunities for interaction with human users in the plant. The safety level to be applied is therefore based on the danger situation that has newly arisen.

In accordance with one embodiment, the standard safety level is furthermore also applied when initiating a safety state on account of an intrusion on the adjusted monitoring region. It is therefore advantageously ensured that the demanded safety level is observed continuously from signal detection through to output of the safety measure.

In accordance with one embodiment, the communicative and failsafe coupling between the mobile component and the further component is set up and terminated dynamically.

Setup of the communicative and failsafe coupling involves, for example, wireless, but nevertheless failsafe, communication being set up, for example, via WLAN. Furthermore, wired communication connections are also possible. The mobile component can register with a communication partner, for example, as a subscriber to the communication that has been set up, and deregister again, dynamically. As such, the mobile component can advantageously connect to different machines when performing an integral task. Alternatively, a central failsafe controller can establish the communication with one of multiple mobile components, which then establishes the temporary failsafe communication with exactly that further component with which the mobile component is meant to collaborate.

The objects and advantages also achieved in accordance with the invention by a safety unit of a mobile component of an industrial automation plant, comprising an interface to a sensor for determining a pose of the mobile component relative to a further component in a failsafe manner, a coupling interface for setting up a communicative and failsafe coupling between the mobile component and the further component, a monitoring unit for adjusting a monitoring region of the mobile component in the event of successful coupling.

The sensor can be regarded as part of a safety device of the mobile component that is installed in a failsafe manner. The manner of operation or the sensor principle of the sensor that is used should preferably be matched to the application. It is also advantageously possible to use 3D sensors, depending on the application.

The monitoring unit is in the form of part of a controller, in particular a failsafe controller, or is in the form of the controller of the mobile component. In one embodiment, therefore, the safety system can be formed on the controller, or in other words a controller, in particular a programmable logic controller (PLC), of the mobile component can be a safety controller.

In accordance with one embodiment, the safety unit further comprises a signal output unit for initiating a safety state, in particular of the mobile component and/or of the further component, in the event of an intrusion on the adjusted monitoring region.

It is also an object of the invention to provide a safety system having a safety unit according to the above embodiments, where the safety system further comprises at least one sensor, in particular at least one 2D sensor, 3D sensor or laser scanner.

In accordance with one embodiment, the further component is a further mobile component. The mobile component and the further mobile component can be AGVs or AMRs. In general, a mobile component should be understood to mean all mobile units and dynamically addable or removable structures in a production plant containing the described safety system.

In accordance with one embodiment, the further component is a stationary component. The stationary component in this case can be equipped with its own safety unit. By way of example, the stationary component is equipped with its own safety sensor system or there is provision in the stationary component for a safety device in the form of a safety controller. The safety controller actuates machines or robots or generally controllable moving parts in or on the stationary component in a safety-oriented manner, for example, and stops them in a stop position, for example, until a coupling with the mobile component has been successfully set up. By way of example, the stationary component does not have a safety sensor system or an interface to applicable sensors either.

The invention further relates to a method for adjusting failsafe monitoring in an industrial automation plant, where a communicative and failsafe coupling of a mobile component of the industrial automation plant with a further component of the industrial automation plant adjusts a monitoring region of the mobile component such that safety regions to be monitored based on the further component are monitored at least in part by means of the mobile component.

In accordance with one embodiment, the communicative and failsafe coupling is performed based on a failsafe determination of a pose of the mobile component relative to the further component.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below based on exemplary embodiments with reference to the figures, in which.

DETAILED DESCRIPTION OF THE EXEMPLARY EMBODIMENTS

In the figures, elements having the same function are provided with the same reference signs, unless stated otherwise.

Figure 1:
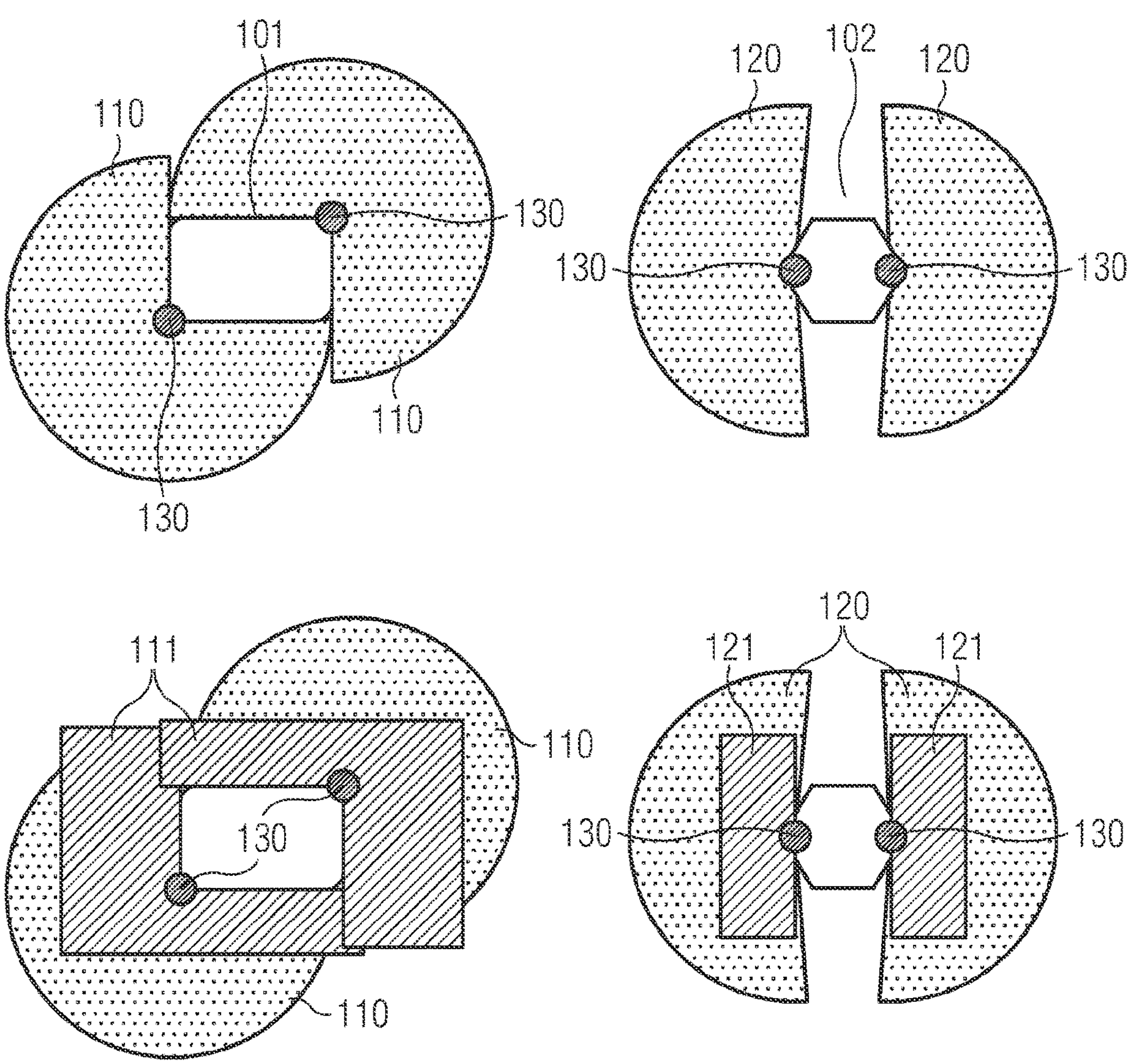
FIG. 1 shows a schematic representation of an AGV having a safety sensor system in accordance with the prior art.
Figure 2:
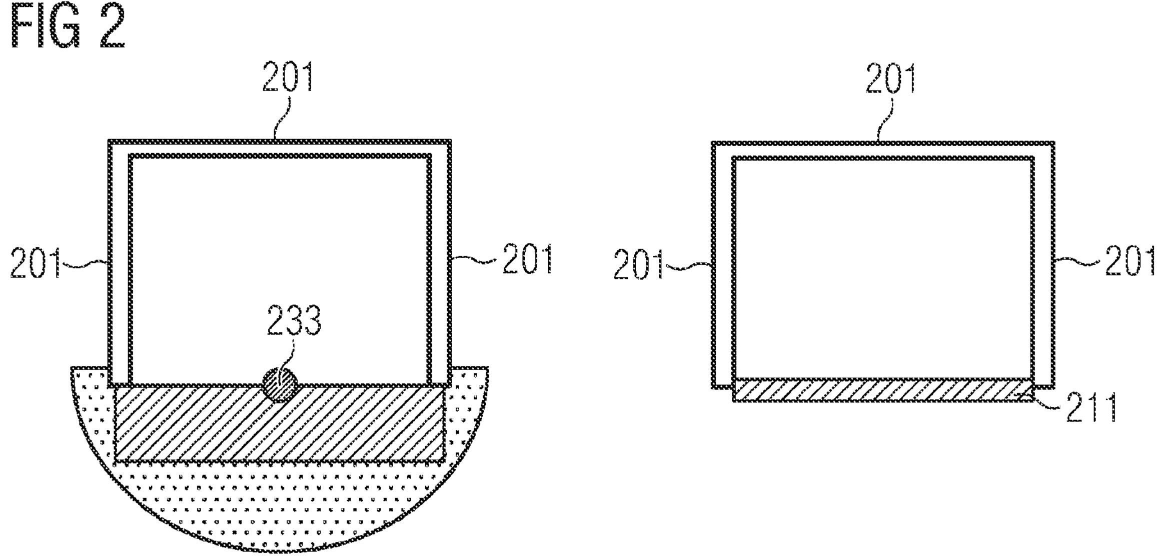
FIG. 2 shows a schematic representation of a stationary machining station having a safety sensor system in accordance with the prior art.
Figure 3:
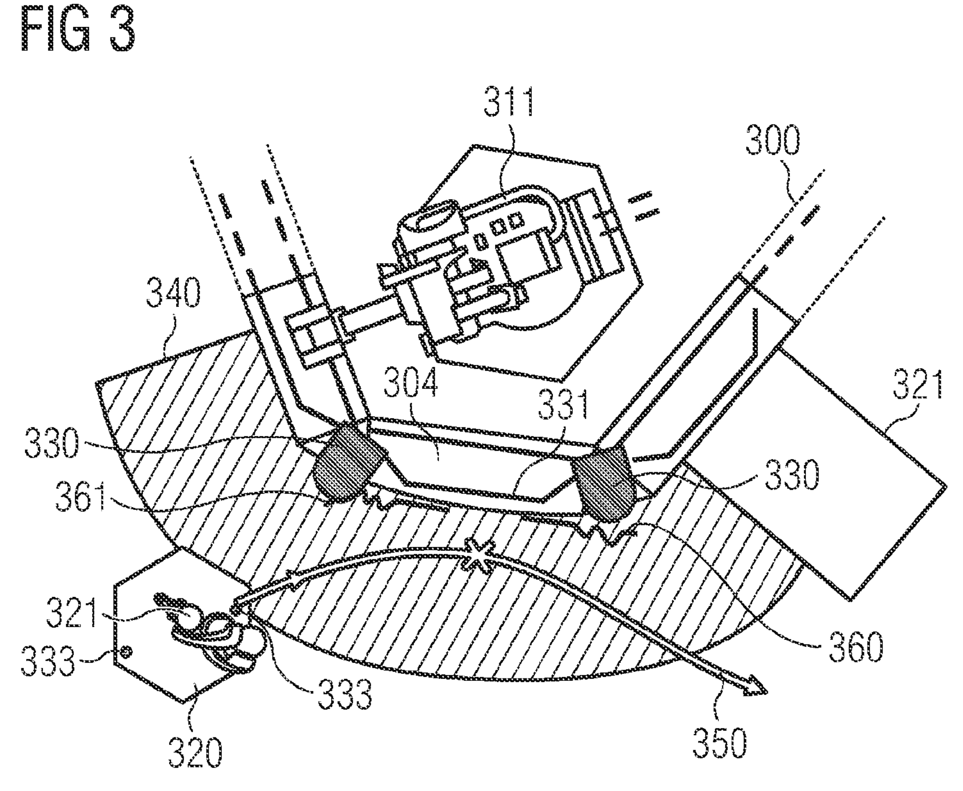
FIG. 3 shows a schematic representation of a system comprising a mobile component and a further component in accordance with a first exemplary embodiment of the invention.

A first exemplary embodiment of the invention is explained with reference to FIG. 3, which schematically shows parts of a flexible manufacturing system 300 in which modules 320, 321 dock and undock dynamically. A robot arm 311 is statically installed in the middle of a hexagon that surrounds it. The individual production modules 320, 321 can dock on five of the six sides of the hexagon, for example. Three of these five sides are shown by way of example. The sixth side is equipped with conveyor belts and affords no opportunity for coupling (not shown).

By way of example, the modules are an AGV 320 or a mobile, in particular movable, machining station 321 having its own safety sensor system. The interaction between the AGV 320 as a mobile component and the stationary manufacturing station 300 as a further component is considered in more detail below.

On the sides of the stationary manufacturing station 300 on which the modules can dock, an interaction between the robot arm 311 and the modules is meant to be possible and in particular a manipulator 321 situated on the AGV 320 is meant to be able to enter the hexagon, such as to introduce manufactured parts or tools for the robot arm 311 or to remove workpiece carriers from a conveyor belt within the hexagon.

The stationary manufacturing station 300 is equipped with safety laser scanners 330 in the corners of the hexagon and with light barriers 331 along the sides (shown only on one side by way of example). The safety laser scanners 330 allow the function that the robot arm 311 operates at reduced speed in the event of intrusion on the monitoring regions 340 of the laser scanners 330, i.e., the function initiates safety-oriented reduced speed or safe limited speed (SLS). There is an intrusion on the monitoring region 340 if at least part of the AGV 320 is in the monitoring region 340.

The light barriers 331 ensure that an intrusion on the light barrier results in safety-oriented monitored stoppage of the robot arm, i.e., the safe torque off function (STO) being initiated.

If the AGV 320 is now moved close to the stationary manufacturing station 300 along the path of movement 350, the robot arm 311 is slowed because the outer shell of the AGV 320 intrudes on the monitoring region 340 of the laser scanners 330.

After the AGV 320 has arrived at one side, the dock 304, the pose of the AGV 320 needs to be determined in a safety-oriented manner so that coupling with the stationary manufacturing station 300 can occur. The safety-oriented determination of the pose of the mobile robot is accomplished using the safety function "safety-oriented contour detection" of the laser scanners 333 of the AGV 320. At each position on the hexagon at which there is a need for failsafe detection, there is provision for a contour 360, 361, which is of unique configuration so that only the respective contour 360, 361 is detected by the laser scanners and mistakes are prevented. Like the normal monitoring regions or safety fields, contours are set up statically in the configuration of the laser scanners and can then be evaluated using binary and processed using logic. For this purpose, in particular the contour 360 is available to the laser scanners 333 of the AGV 320 as a template and the surroundings scanned by means of the laser scanners 333 are compared against the stored contour 360.

The contour as captured by the laser scanners moves relative to the AMR when the position or orientation of the latter changes. This means that the appropriate pose is ensured when a contour is detected and verified on the basis of the stored templates. In other words, there is only one valid pose of the AMR relative to the contour that results in a match.

Figure 4:
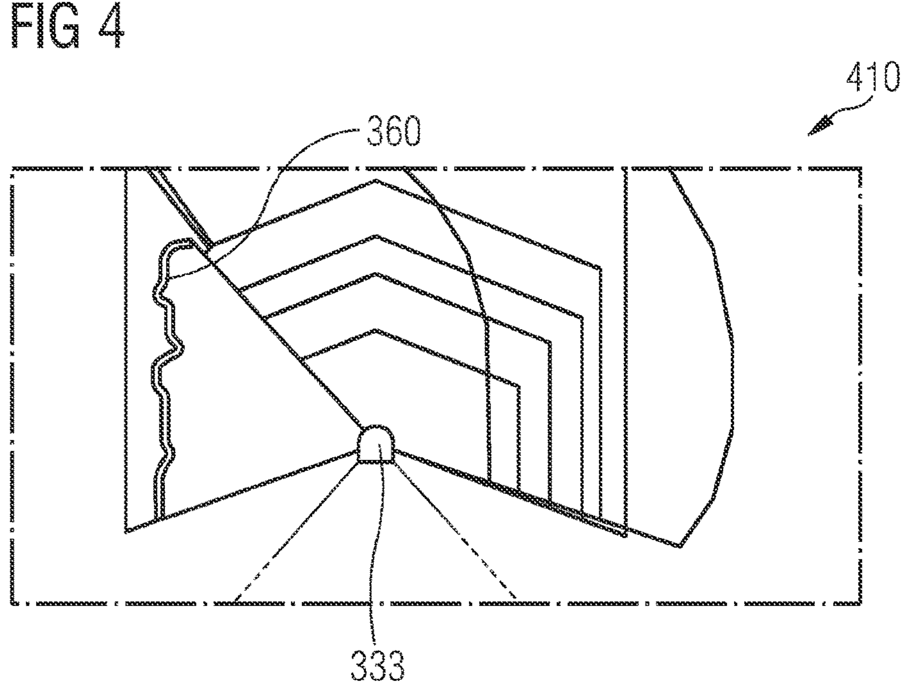
FIG. 4 shows a schematic representation of a visual display for a computer program for contour detection in accordance with the first exemplary embodiment of the invention.

FIG. 4 shows a screenshot 410 of the computer program "SICK Safety Designer", with the contour 360 on the left-hand side of the scan as the stationary manufacturing station 300 is approached.

The safety-oriented detection of the contour 360 via the laser scanner 333 based on PLd can be used to effect the case switchover for the sensor system to the case of the coupled system in a failsafe manner. All of the sensors involved comply with safety level PLd, which arises as a result of the danger and is predefined thereby.

When the AGV has achieved the envisaged pose, a previously stored contour having been detected by the laser scanner and the latter outputting a binary signal for the verified pose, the coupling between the AGV 320 and the stationary manufacturing station 300 is initiated. To this end, continuously safety-oriented methods based on PLd as described above are also used. In this example, the contour is installed permanently on a stationary machine. It would thus also be conceivable to convert its own position and/or orientation to a world coordinate system using the relative position with respect to the stationary component, or using the position thereof in the world. This calculation can also occur in the F-PLC and thus in a failsafe manner.

Following successful coupling, the AGV 320 and the stationary manufacturing station 300 are a failsafe integral system 500. The laser scanners 330 of the stationary manufacturing station 300 then change the monitoring case and no longer recognize the AGV 320 as an interfering object, which means that an intrusion on the monitoring region 340 is no longer detected and reported. The monitoring region of the stationary manufacturing station 300 is adjusted such that laser scanners 330 responsible for the surface of the AGV are switched over such that they no longer monitor the surface of the module, which is now at a standstill.

The laser scanners 333 of the AGV 320 also change the monitoring case and evaluate fields that affect both the manipulator 321 of the AGV 320 and the robot arm 311 in the hexagon.

Figure 5:
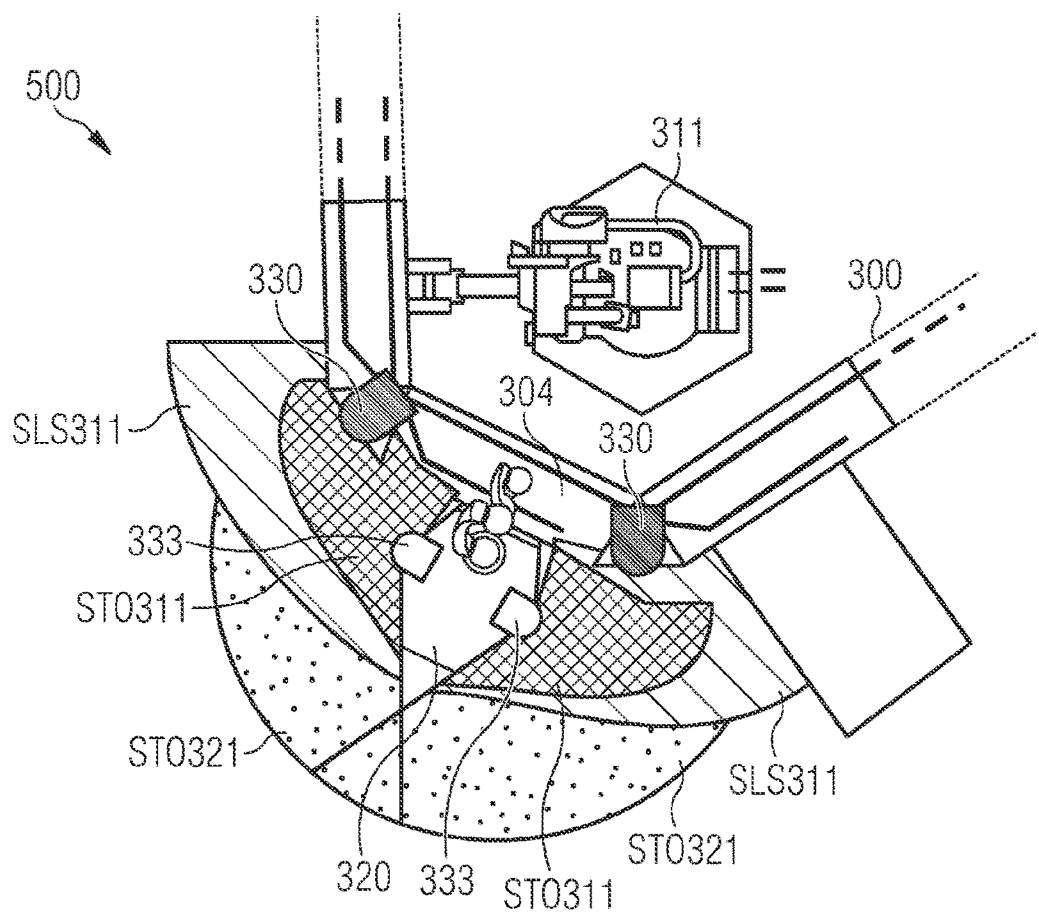
FIG. 5 shows a schematic representation of an adjusted monitoring in accordance with the first exemplary embodiment of the invention.

FIG. 5 graphically shows the adjusted monitoring regions, safety regions and light barriers following successful coupling. It is true for all of the illustrated monitoring regions that they are logically stored regions or fields. In particular, the schematic representation of the monitoring regions and safety fields in the figures is not intended to give expression to an actually occurring visual display or a simulation. Schematic representations in engineering programs or simulations in simulation programs can, however, be advantageously employed in order to program the monitoring regions and the adjustment thereof.

The adjusted monitoring regions SLS311, depicted as ruled regions, start out from the laser scanners 330 of the fixed plant 300 and, if intruded upon, then result in the safe speed of the robot arm 311 in the hexagon. The adjusted monitoring regions STO311, depicted in a checkered manner, are evaluated by the laser scanners 333 of the AGV 320 and result in safe stoppage of the robot arm 311. They are needed because otherwise a human being could reach through the "muted", i.e., unlocked, region of the light grid without triggering safe stoppage of the robot arm 311. By way of example, the light barrier on the side of the dock 304 of the hexagon has been deactivated only in the inner region, which the manipulator 321 can enter on account of the geometrical dimensions. The adjusted monitoring regions STO321 result in uncontrolled shutdown of the manipulator 321 on the AGV 320.

The first exemplary embodiment shows the relevance of correct and failsafe detection of the orientation of the AGV 320. Were the orientation to be detected incorrectly, and the AGV 320 were to be standing twisted through a few degrees relative to the stationary plant 300 with the contour 360 attached thereto, for example, gaps in the monitored fields would then arise in which a human being could approach the plant without being detected. Moreover, depending on the misorientation, erroneous contour detection could result in the adjusted monitoring regions STO311 and STO321 triggering if the stationary plant were to intrude on them, with the result that possibly both the robot arm 311 in the hexagon and the manipulator 321 on the AGV would be shut down.

The technical protective measures planned according to the first exemplary embodiment can advantageously be used to successfully complete the three-stage iterative process for risk assessment and risk reduction from DIN EN ISO 12100.

An exemplary embodiment from the automotive industry is described based on a second exemplary embodiment. By way of example, automotive manufacturers are counting on the conventional conveyor belt in factories being replaced by a fleet of AGVs. Individual manufacturing cells therefore likewise no longer need to be arranged sequentially, but rather can be placed in a shed more or less without restriction, the placement adhering to the dependencies and sequences that continue to exist for the assembly of a car.

In this scenario, AGVs transport the car bodies and take them from one manufacturing cell to the next, depending on the specific features of the relevant vehicle. Such a manufacturing cell 600 is shown by way of example in FIG. 6, there being provision in a real embodiment for many manufacturing cells in a factory. The manufacturing cells 600 are more or less travelled through by the AGVs, where the AGVs stop in the middle so that the cell can perform its production steps. FIG. 7 shows such a situation in which an AGV 620 is in the manufacturing cell 600. The AGV is in particular stationary and does not move relative to the manufacturing cell 600. For reasons of clarity, the representation of the AGV 620 is also limited to one, there being provision for a multiplicity of AGVs, in particular more AGVs than manufacturing cells.

Figure 6:
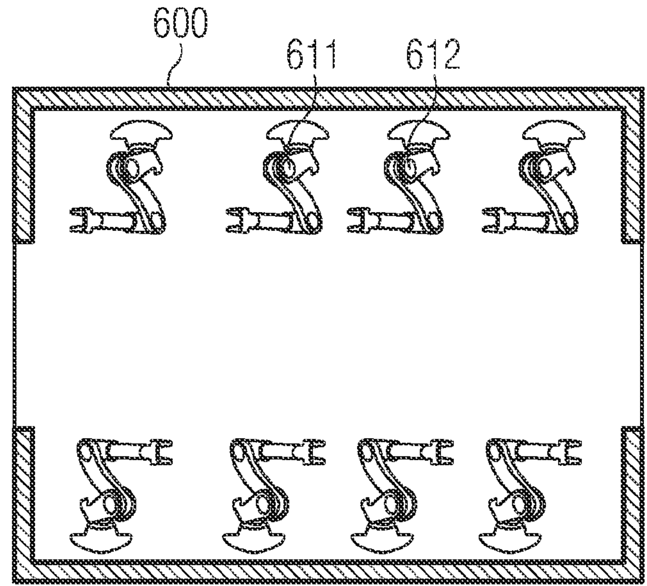
FIG. 6 shows a schematic representation of a further component in accordance with a second exemplary embodiment of the invention.
Figure 7:
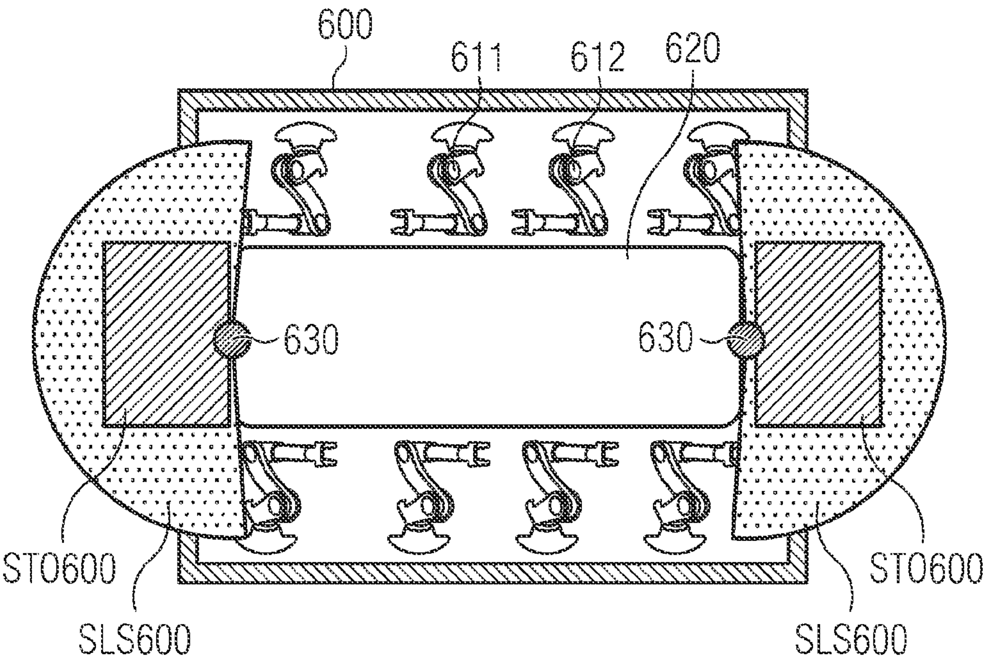
FIG. 7 shows a schematic representation of an adjusted monitoring in accordance with the second exemplary embodiment of the invention.

If, as shown in FIG. 6, there is not an AGV with a car body in the manufacturing cell 600, all moving parts, such as robots 611, 612, are in a safe state, in particular in an STO. To this end, there is provision, for example, for safety-oriented controllers for actuating the robot drives.

An AGV 620 has an appropriate sensor system so that it can travel around between the manufacturing cells in the shed, in which there are also human beings. The AGV 620 is therefore able to independently monitor that it is not a danger to human beings when it enters the manufacturing cell 600. As soon as the AGV 620 is in the manufacturing cell 600 and has performed safety-oriented position and orientation detection by means of laser scanners, it makes a secure communication connection to the manufacturing cell 600. The AGV 620 uses the laser scanners 630 available for navigation on the front and rear.

As soon as a human being approaches the manufacturing cell 600 and therefore the danger zone, he/she is detected by the laser scanners 630 of the AGV 620. A movement by a human being in the adjusted monitoring region SLS600 is reported to the failsafe controller of the manufacturing cell 600 via the failsafe communication connection, where the controller then reduces all actuators to a safe speed in accordance with the SLS function. In particular, the AGV 620 provides separate reports for the front and rear, with the result that the cell controller can also slow only the directly affected actuators instead of having to stop the complete cell. Should a human being get too close to the manufacturing cell 600 and be detected in the adjusted monitoring region STO600, then all robots 611, 612 are shut down in accordance with an STO.

In accordance with the second exemplary embodiment, the manufacturing cell 600 and the AGV 620 are advantageously coordinated with one another in terms of their dimensions such that only the access regions of the manufacturing cell 600 need to be made safe and these can be monitored just by the sensor system of the AGV 620. Depending on the application and planning, fields other than those used for navigation through the plant are used as adjusted monitoring regions SLS600, STO600 for the monitoring by the AGV 620.

Figure 8:
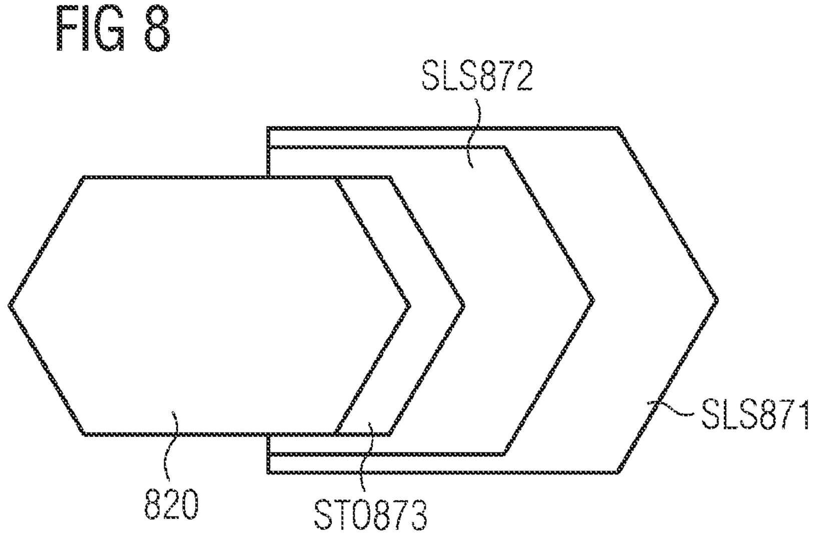
FIG. 8 shows a schematic representation of monitoring regions of a mobile component during navigation in accordance with the prior art.

FIG. 8 is used to illustrate how navigation monitoring fields of an AGV 820 that is in travel mode might look. Three adjoining fields SLS871, SLS872, STO873 are shown that, when an object enters the respective region, trigger three different safety functions in a staggered manner, in particular initiation of the safety-oriented speed safety function in the case of each of SLS871 and SLS872, using two different predefined, in particular configured, setpoint speeds, and initiation of an STO in STO873. As such, the AGV 820 can be made to move slower and slower in the direction of travel the closer it gets to an object or the closer an object gets to the AGV 820, and to be finally shut down.

On comparing the adjusted monitoring regions from FIG. 7 with the navigation monitoring regions from FIG. 8, it becomes clear that both the geometry of the monitoring regions, in particular the selection of fields to be monitored from the set of fields that can be monitored in total, and a safety function stored depending on the adjusted monitoring region differ from one another. For performance reasons, the evaluation of monitoring fields is typically combined into monitoring cases with few, such as eight, fields.

In conventional factories, each manufacturing cell needs to be equipped with its own safety-oriented sensor system to comply with the established standards. The manufacturing cell 600 as a further stationary component in accordance with the second exemplary embodiment of the invention does not require its own expensive safety-oriented sensor system, which means that a great savings potential arises for automotive manufacturers. The safety level of the plant overall is advantageously not reduced in this case. This example is used for illustrative purposes and can be applied to examples from other manufacturing sectors.

Figure 9:
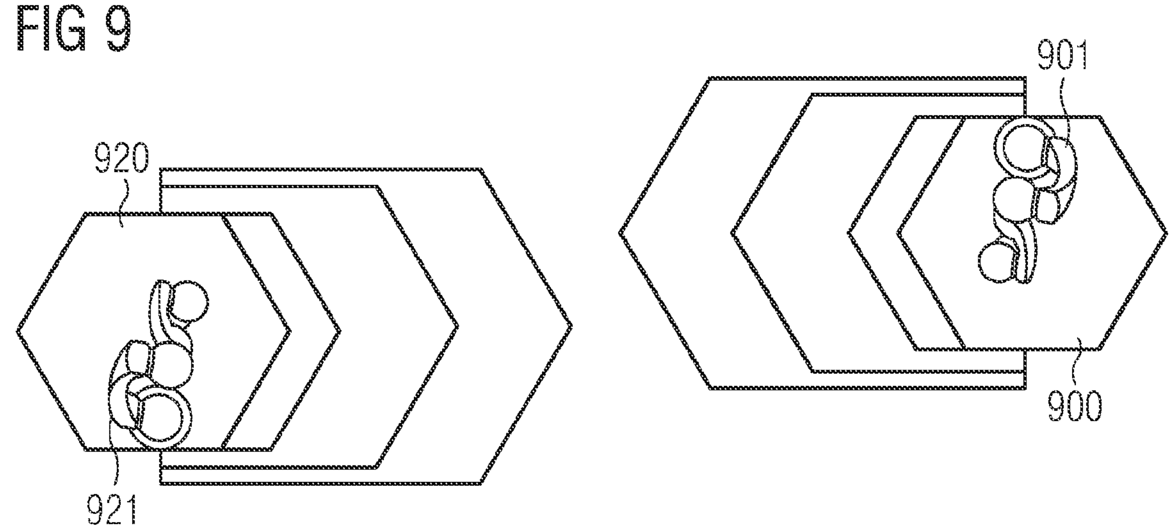
FIG. 9 shows a schematic representation of a mobile component and a further mobile component in accordance with a third exemplary embodiment of the invention.
Figure 10:
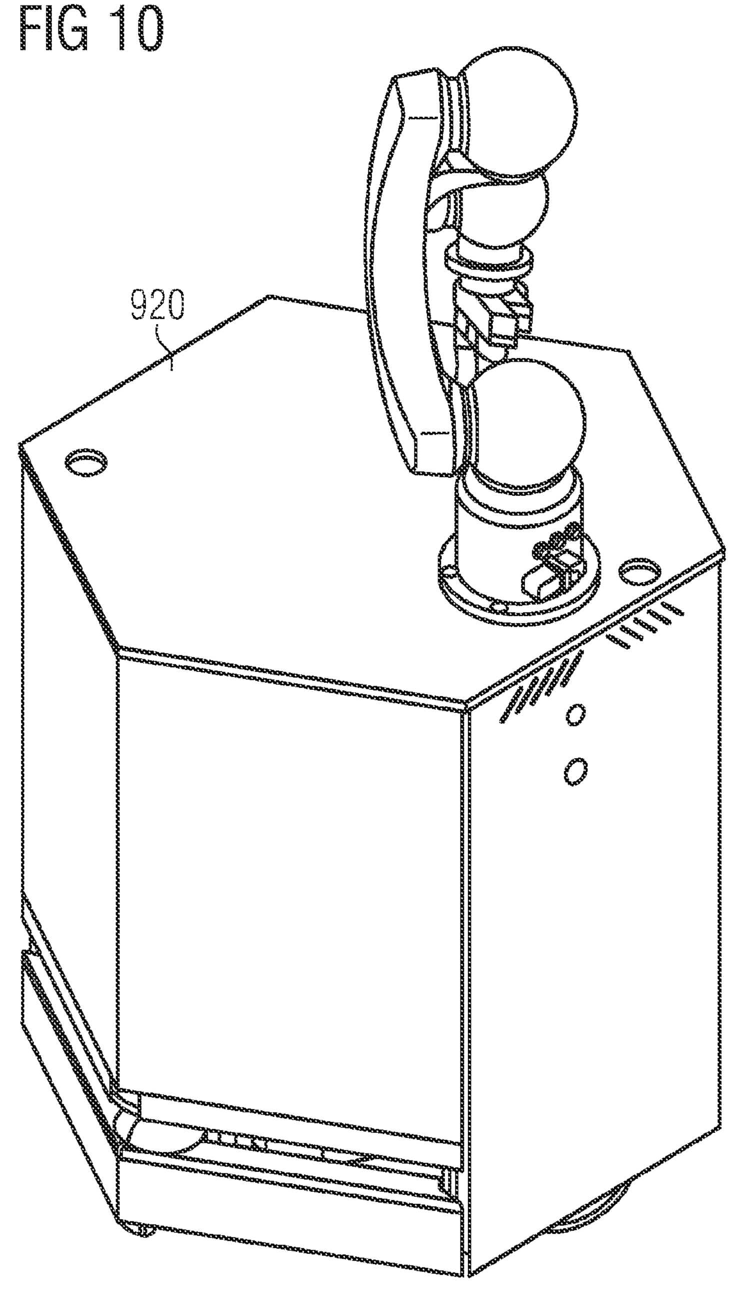
FIG. 10 shows a schematic perspective view of a mobile component.

In accordance with a third exemplary embodiment of the invention, there is provision for the coupling of two AMRs. FIG. 9 schematically shows two AMRs moving over an open surface, an AMR 920 and a further AMR 900. By way of example, the two AMRs jointly perform a joining process or exchange material or tools with one another. FIG. 10 shows such an AMR in a perspective representation from the side for the purposes of illustration.

To this end, the AMRs 920, 900 each have a manipulator 921, 901 installed on their platform, and these can move only if there is the assurance that people are keeping sufficient distance from the respective manipulator and also from the respective AMR. An AMR 900 is at least initially unable to distinguish between people, robots and items via its safety sensor system. Consequently, failsafe detection of a contour, such as mounted on the AMR 900, is also used here. Following failsafe detection of a contour on the AMR 900 by the AMR 920, the AMR 920 can be certain that this is the desired AMR 900, such as a nearby AMR 900 within a flexible manufacturing plant or the supplying AMR provided in a flexible manufacturing process.

Up to this point, the respective safety case of the AMRs 900, 920 that the latter use for their navigation in the plant can advantageously be activated. By way of example, both AMRs 900, 920 evaluate fields while travelling, as described based on FIG. 8 for an AGV without a manipulator. A detected movement by an object or human being within the fields results in a reduced speed or STO being predefined for the drive of the AMR.

Figure 11:
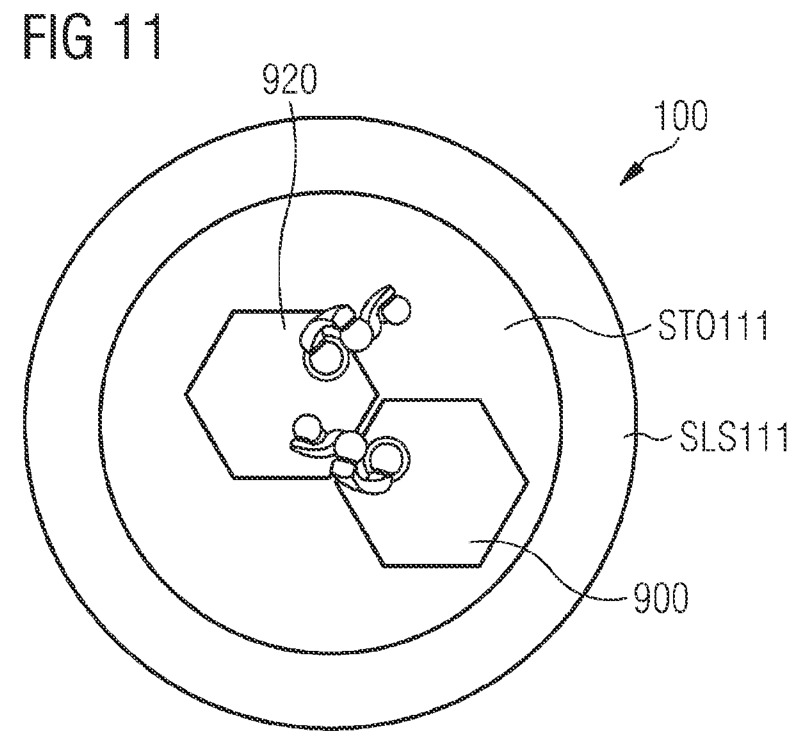
FIG. 11 shows a schematic representation of an adjusted monitoring in accordance with the third exemplary embodiment of the invention.

Following failsafe detection of the AMR 900 by the AMR 920, or failsafe detection of the AMR 920 by the AMR 900, for which purpose the AMRs should be standing close enough in front of one another, a coupling can be initiated and the monitoring case of the sensor system can be changed. FIG. 11 shows the AMRs 900, 920 as a coupled failsafe integral system 100 with common adjusted monitoring regions STO111, SLS111 in which they can perform their job. Here, the safety sensors of one AMR compensate for the safety regions concealed by it from the point of view of the other AMR, which are needed on account of the other AMR, and vice versa.

The safety zones formed from the adjusted monitoring regions are in turn made up of individual fields, the geometry of which is obtained based on the sensor system. Depending on the number of sensors installed and of the fields that can be monitored thereby based on the respective safety units of the AMRs, circular adjusted monitoring regions as shown in FIG. 11 are obtained or more complex geometries as illustrated in the exemplary embodiment in FIG. 5. The circular monitoring regions shown in FIG. 11 can be particularly achieved using multiple sensors mounted at the respective outer edges of the AMR.

In particular, the monitoring regions provided separately for each AMR are not simply superimposed, but rather the common adjusted monitoring regions are established for the danger situation that arises overall as a result of the coupled AMRs and take into consideration both dangers that newly arise on account of the coupling and monitoring that is not or no longer needed on account of the coupling, for example between the AMRs or within the AMRs.

For both AMRs, the adjustment is made in terms of the configuration or extent of monitored surfaces and preferably also in terms of safety functions to be initiated for each monitoring region that is monitored and intruded upon.

The common inner adjusted monitoring region STO111 causes a momentary unlocking or safe torque off function, for example. By way of example, there is provision for an STO as a safety function of the monitoring region STO111 at a standstill and following successful coupling, because it is then possible for the manipulators on the AMR to move. The outer adjusted monitoring region SLS111 has associated safe speed monitoring for one or both manipulators 901, 921, for example, which is initiated as a safety function when an object is detected. In embodiments in which the manipulators 901, 921 are technically not configured to support safe speed monitoring, the adjusted monitoring region can also be implemented with a warning function that brings about output of an alarm signal.

The method in accordance with the third exemplary embodiment is not limited to two participating AMRs, but rather can also be applied using more than two units, which means that multiple AMRs can find themselves together to jointly work on a complex job.

Figure 12:
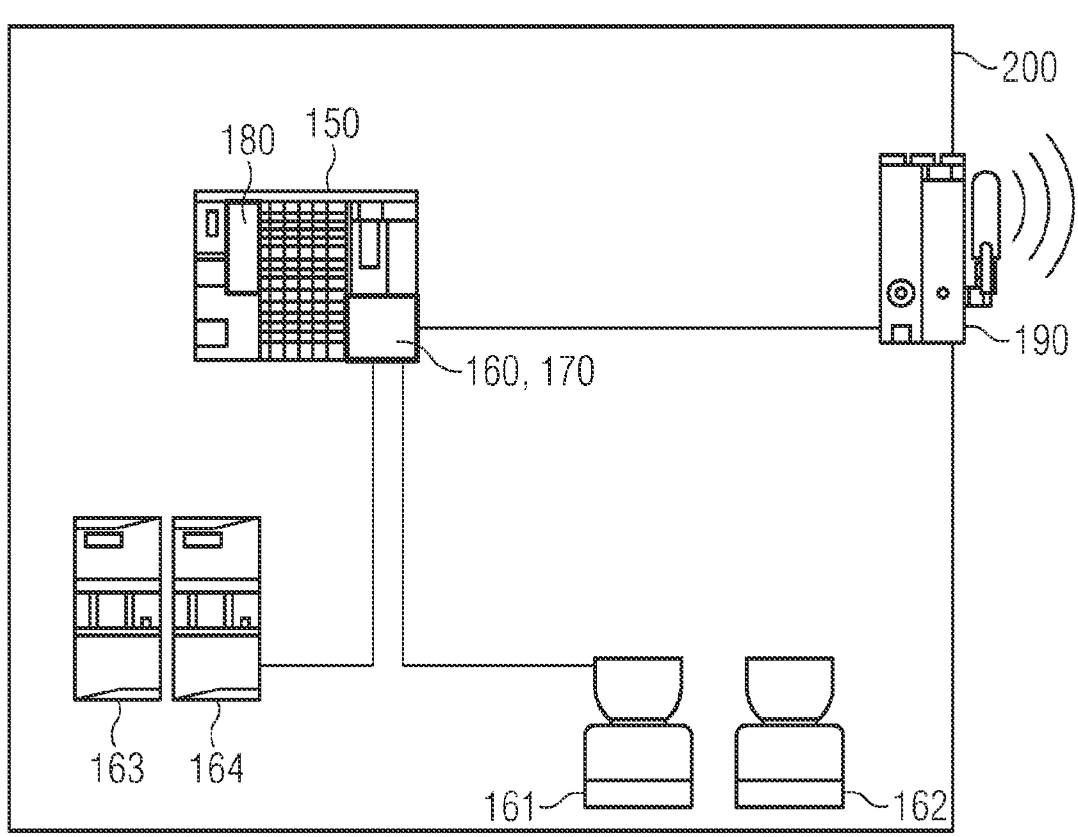
FIG. 12 shows a schematic representation of a safety system of a mobile component according to any one of the cited exemplary embodiments.

FIG. 12 shows a safety system 200, as can be employed as desired in a mobile component of the above-described embodiments. The system has a safety unit 150, such as a failsafe PLC, having an interface 160 to sensors 161, 162 for determining a pose of the mobile component relative to a further component in a failsafe manner. Additionally, there is provision for a coupling interface 170 for setting up a communicative and failsafe coupling between the mobile component of a further component by means of a WLAN communication assembly 190. Any one of the further components described in the above-described exemplary embodiments can be considered. The coupling interface 170 and the interfaces for actuating the other failsafe components, in particular the interface 160 to the sensors and an interface to the drives of the mobile component, are advantageously realized as a common interface. Parallel interfaces that support wire-based and communication-based connections, for example, can also be used.

There is furthermore provision for a monitoring unit 180 for adjusting a monitoring region of the mobile component in the event of successful coupling. The safety unit 150 is, for example, a failsafe controller having the cited integrated interfaces and the monitoring unit.

Control signals that implement the safety functions and are ascertained in a failsafe manner are output to the various failsafe drives 163, 164 in a failsafe manner or via appropriate I/O modules, for example, using communication technology.

A computer program product having a computer program that comprises means for performing the method according to one of the embodiments described above can be executed on the safety unit 150, in particular a failsafe controller or processor. In particular, a logic area of the monitoring unit interacts with other logic areas of the controller or processor for this purpose.

Figure 13:
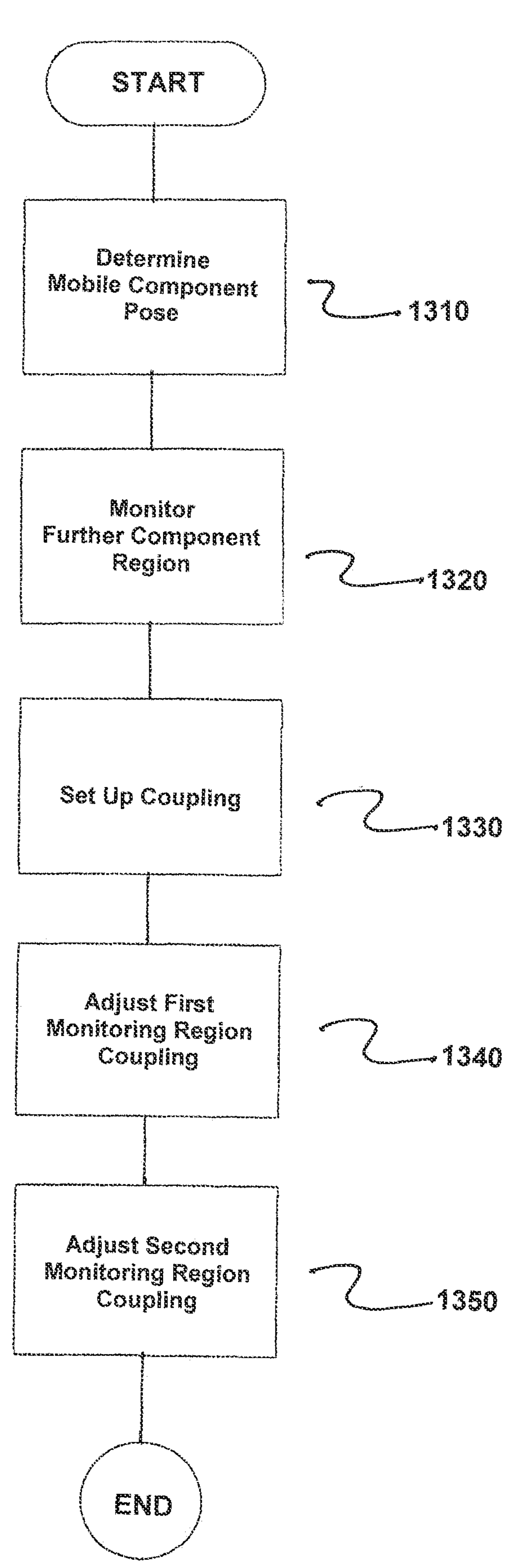
FIG. 13 is a flowchart of the method in accordance with the invention.

FIG. 13 is a flowchart of the method for adjusting failsafe monitoring in an industrial automation plant.

The method comprises determining, by a first sensor 333 of a mobile component 320 of the industrial automation plant, a pose of the mobile component 320 relative to a further component 300 of the industrial automation plant in a failsafe manner, as indicated in step 1310. Here, the first sensor 333 monitors a first monitoring region of the mobile component 320.

Next, a second sensor 330 monitors a second monitoring region of the further component 300, as indicated in step 1320.

Next, a communicative and failsafe coupling is set up between the mobile component 320 and the further component 300, as indicated in step 1330.

Next, successful coupling results are adjusted in the first monitoring region of the mobile component 320, as indicated in step 1340.

Next, successful coupling results in the second monitoring region of the further component 300 are also adjusted, as indicated in step 1350.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for adjusting failsafe monitoring in an industrial automation plant, the method comprising:

determining, by a first sensor of a mobile component of the industrial automation plant, a pose of the mobile component relative to a further component of the industrial automation plant in a failsafe manner, said first sensor monitoring a first monitoring region of the mobile component;

monitoring, by a second sensor, a second monitoring region of the further component;

setting up a communicative and failsafe coupling between the mobile component and the further component;

adjusting, upon successfully setting up the communicative and failsafe coupling, the first monitoring region of the mobile component; and adjusting, upon successfully setting up the communicative and failsafe coupling, the second monitoring region of the further component.

2. The method as claimed in claim 1, wherein an intrusion on an adjusted second monitoring region of the mobile component causes initiation of a safety function of at least one of the mobile component and the further component.

3. The method as claimed in claim 1, wherein an intrusion on the adjusted second monitoring region of the further component causes initiation of a safety function of at least one of the mobile component and the further component.

4. The method as claimed in claim 1, wherein the first monitoring region of the mobile component is adjusted based on one of (i) a safety region of the further component which is activated up to the coupling and (ii) a safety region of the further component which is demanded on account of the coupling.

5. The method as claimed in claim 1, wherein the first monitoring region of the mobile component is adjusted by virtue of regions previously monitored by a second monitoring region of the further component being monitored by the first monitoring region of the mobile component on account of the coupling.

6. The method as claimed in claim 1, wherein the first monitoring region of the mobile component is adjusted by virtue of a monitoring mode, in particular a safety function, being adjusted, in particular supplemented or switched over, at least for a portion of the monitoring region comprising regions which overlap fields monitored by a second monitoring region of the further component up to the coupling.

7. The method as claimed in claim 1, wherein the second monitoring region of the further component is adjusted by virtue of a region being removed from the monitoring by the further component based on the position of the mobile component.

8. The method as claimed in claim 1, wherein the second monitoring region of the further component is adjusted by deactivating a safety device between the mobile component and the further component.

9. The method as claimed in claim 1, wherein the pose is detected via a contour detection method.

10. The method as claimed in claim 9, wherein a contour of the further component is detected for the contour detection method.

11. The method as claimed in claim 1, wherein a standard safety level comprising a certified safety level is applied when determining the pose of the mobile component, when setting up the communicative and failsafe coupling and when adjusting the monitoring region.

12. The method as claimed in claim 11, wherein the standard safety level is also applied when initiating a safety state caused by an intrusion on the adjusted monitoring region.

13. The method as claimed in claim 1, wherein the communicative and failsafe coupling between the mobile component and the further component is set up and terminated dynamically.

14. A safety system comprising:

a safety unit including an interface to a sensor for determining a pose of a mobile component relative to a further component in a failsafe manner;

a coupling interface for setting up a communicative and failsafe coupling between the mobile component and the further component;

a monitoring unit for adjusting a first monitoring region of the mobile component in an event of successful coupling and the second monitoring region of the further component, the safety system further comprising at least one sensor; and a failsafe controller configured to:

determine, via the at least one sensor, a pose of the mobile component relative to the further component of the industrial automation plant in a failsafe manner, said first sensor monitoring the first monitoring region of the mobile component;

monitor, via a second sensor a second monitoring region of the further component;

set up a communicative and failsafe coupling between the mobile component and the further component;

adjust, upon successfully setting up the communicative and failsafe coupling, the first monitoring region of the mobile component; and adjust, upon successfully setting up the communicative and failsafe coupling, the second monitoring region of the further component.

15. The safety system having a safety unit as claimed in claim 14, wherein the further component comprises a further mobile component.

16. The safety system having a safety unit as claimed in claim 14, wherein the further component comprises a stationary component.

17. The safety system having a safety unit as claimed in claim 15, wherein the further component comprises a stationary component.

* * * * *